(12) United States Patent
Nielsen et al.

(10) Patent No.: US 10,584,684 B2
(45) Date of Patent: Mar. 10, 2020

(54) WIND TURBINE BLADES AND POTENTIAL EQUALIZATION SYSTEMS

(71) Applicant: LM WP PATENT HOLDING A/S, Kolding (DK)

(72) Inventors: Lars Nielsen, Skanderborg (DK); Klavs Jespersen, Kolding (DE)

(73) Assignee: LM WP PATENT HOLDING A/S, Kolding (DK)

( * ) Notice: Subject to any disclaimer, the term of this patent is extended or adjusted under 35 U.S.C. 154(b) by 0 days.

(21) Appl. No.: 16/064,758

(22) PCT Filed: Dec. 19, 2016

(86) PCT No.: PCT/EP2016/081744
§ 371 (c)(1),
(2) Date: Jun. 21, 2018

(87) PCT Pub. No.: WO2017/108691
PCT Pub. Date: Jun. 29, 2017

(65) Prior Publication Data
US 2019/0003462 A1 Jan. 3, 2019

(30) Foreign Application Priority Data
Dec. 23, 2015 (EP) .................................... 15202398

(51) Int. Cl.
*F03D 1/06* (2006.01)
*F03D 80/30* (2016.01)

(52) U.S. Cl.
CPC .......... *F03D 80/30* (2016.05); *F03D 1/0675* (2013.01); *F05B 2220/30* (2013.01);
(Continued)

(58) Field of Classification Search
CPC .................. F03D 80/30; F03D 1/0675; F05B 2280/2001; F05B 2220/30; F05B 2230/50;
(Continued)

(56) References Cited

U.S. PATENT DOCUMENTS

| | | | | |
|---|---|---|---|---|
| 7,364,407 B2* | 4/2008 | Grabau | ................... | F03D 1/065 416/229 R |
| 7,651,320 B2* | 1/2010 | Hansen | .................. | H02G 13/00 416/1 |
| 2006/0280613 A1* | 12/2006 | Hansen | .................. | H02G 13/00 416/230 |

FOREIGN PATENT DOCUMENTS

| | | |
|---|---|---|
| EP | 1112448 B1 | 7/2003 |
| EP | 1664528 B1 | 12/2010 |

(Continued)

OTHER PUBLICATIONS

Extended European Search Report dated Jun. 16, 2017 in corresponding European Application No. 15202398.2.

*Primary Examiner* — Eldon T Brockman
(74) *Attorney, Agent, or Firm* — Nath, Goldberg & Meyer; Jerald L. Meyer; Tanya E. Harkins

(57) ABSTRACT

A wind turbine blade, extending longitudinally root end to tip end, having a load carrying structure, a shell body and a lightning protection system is described. The load carrying structure is fiber-reinforced polymer in a plurality of stacked layers comprising electrically conductive fibers. The lightning protection system comprises a lightning receptor arranged freely accessible in or on the shell body and a lightning down-conductor electrically connected to the lightning receptor and is configured to be electrically connected to a ground connection. The blade further comprises a potential equalisation system providing a potential equalising connection between a number of the electrically con-
(Continued)

ductive fibers of the load carrying structure and the lightning protection system. The system comprises a dissipating element made of an electrically conductive material which in turn comprises at least one transverse connector arranged to extend transverse through a thickness of the stacked fiber layers and configured to dissipate.

18 Claims, 7 Drawing Sheets

(52) U.S. Cl.
CPC ..... *F05B 2230/50* (2013.01); *F05B 2240/221* (2013.01); *F05B 2240/30* (2013.01); *F05B 2280/2001* (2013.01); *F05B 2280/2006* (2013.01); *F05B 2280/50* (2013.01); *F05B 2280/6001* (2013.01); *F05B 2280/6003* (2013.01); *F05B 2280/6013* (2013.01); *F05B 2280/6015* (2013.01); *Y02E 10/72* (2013.01)

(58) Field of Classification Search
CPC ........ F05B 2280/6015; F05B 2240/221; F05B 2280/6013; F05B 2280/2006; F05B 2280/50; F05B 2280/6001; F05B 2240/30; F05B 2280/6003; Y02E 10/72
See application file for complete search history.

(56) References Cited

FOREIGN PATENT DOCUMENTS

| WO | 2005/026538 A1 | 3/2005 |
| WO | 2007/062659 A1 | 6/2007 |
| WO | 2011/080177 A1 | 7/2011 |
| WO | 2014/124642 A1 | 8/2014 |
| WO | 2015/055215 A1 | 4/2015 |

* cited by examiner

WIND TURBINE BLADES AND POTENTIAL EQUALIZATION SYSTEMS

This is a National Phase Application filed under 35 U.S.C. 371 as a national stage of PCT/EP2016/081744, filed Dec. 19, 2016, an application claiming the benefit of European Application No. 15202398.2, filed Dec. 23, 2015, the content of each of which is hereby incorporated by reference in its entirety.

FIELD OF THE INVENTION

The present disclosure pertains to the field of wind turbine blades, and more specifically to wind turbine blades comprising a lightning protection system. The present disclosure relates to wind turbine blades, and potential equalization systems.

BACKGROUND OF THE INVENTION

A wind turbine blade usually comprises a load carrying structure. The load carrying structure is typically manufactured using fibre reinforcing material. The fibre reinforcing material is often stacked forming a plurality of stacked fibre layers. Today, the fibre layers are mostly selected from glass fibres or carbon fibres or hybrid material.

In carbon fibre blades, it is necessary to potential equalise the carbon fibres to the lightning protection system. Otherwise, static charges may build up or a lightning current from a lightning strike may inadvertently jump into the carbon fibres of the load carrying structure.

A copper mesh may be placed across sections or over the entire load carrying structure. The mesh connects the carbon content laminate with the lightning protection system earth/ground connections. However, high current tests have shown that local damages occur in areas in the interface between the mesh and the carbon laminate of the load carrying structure. These damages may cause delamination in the load carrying structure in areas and can thus lead to severe fatigue damage and failure of the blade.

WO 2007/062659 discloses a wind turbine blade with a lightning protection system with an inner lightning conductor and a lightning receptor arranged at the tip of the blade.

EP 1 112 448 discloses a wind turbine bladed with a carbon fibre reinforced load carrying structure, which is potential equalised to an inner down-conductor of a lightning protection system.

EP 1 664 528 also discloses a wind turbine blade and a carbon fibre reinforced load carrying structure. The wind turbine blade provided with a lightning protection system with an inner lightning conductor. The carbon fibres are potential equalised to the inner lightning conductor. A copper mesh can be used to provide a large contact surface to the carbon fibres.

There is the need for a solution to minimize or prevent such delamination and failures of the wind turbine blades.

SUMMARY OF THE INVENTION

It is an object of the present disclosure to provide a wind turbine blade and a potential equalization system which overcome or ameliorate at least one of the disadvantages of the prior art or which provide a useful alternative.

The present disclosure relates to a wind turbine blade comprising a load carrying structure, a shell body and a lightning protection system. The wind turbine blade extends in a longitudinal direction between a root end and a tip end. The load carrying structure is made of a fibre-reinforced polymer material and comprises a plurality of stacked fibre layers. The stacked fibre layers comprise electrically conductive fibres, such as carbon fibres. The lightning protection system comprises a lightning receptor arranged freely accessible in or on the shell body. The lightning protection system comprises a lightning down-conductor, which is electrically connected to the lightning receptor and is further configured to be electrically connected to a ground connection. The wind turbine blade further comprises a potential equalisation system, which provides a potential equalising connection between a number of the electrically conductive fibres of the load carrying structure and the lightning protection system. The potential equalisation system comprises a dissipating element made of an electrically conductive material. The dissipating element comprises at least one transverse connector that is arranged so as to extend transverse through a thickness of the stacked fibre layers and configured to dissipate.

Thus, the present disclosure provides a wind turbine blade that is protected from delamination damages caused by high lightning current. The risk of lightning strikes damaging the laminate of the load carrying structure is reduced as the lightning current is predominantly captured by the lightning receptors and conducted down to ground by the down conductor while the potential differences between the electrically conductive fibres of the load carrying structure and the lightning protection system is equalised by the potential equalisation system with transverse connector dissipating energy through the thickness of the stacked fibre layers. The traverse connectors allow a direct electrical contact through a plurality of the layers in the load carrying structure, whereby energy from a lightning strike may be dissipated into a larger volume of carbon fibres.

The present disclosure relates to a potential equalization system. The potential equalization system comprises a dissipating element made of an electrically conductive material. The dissipating element comprises a substantially planar element and at least one transverse connector, which extends from the substantially planar element and is configured to be arranged and to extend transverse through a thickness of electrically conductive fibre layers and configured to dissipate energy into a plurality of electrically conductive fibres layers. The potential equalization system comprises a potential equalising connection configured to connect the dissipating element to a lightning protection system. By a substantially planar element is meant an element, which may be arranged so as to follow a layer of the stacked fibre layers in the load carrying structure. The planar element may be arranged in a separate layers stacked on one of the fibre layers of the load carrying structure.

It is clear that the aforementioned aspects of the invention may be combined in any way and are linked by the common aspect of potential equalization across a laminate thickness.

It is noted that advantages enunciated with respect to the wind turbine blade apply to the potential equalization system as well.

BRIEF DESCRIPTION OF THE FIGURES

Embodiments of the invention will be described in more detail in the following with regard to the accompanying figures. The figures show one way of implementing the present invention and are not to be construed as being limiting to other possible embodiments falling within the scope of the attached claim set.

DETAILED DESCRIPTION OF THE INVENTION

Figure 1:
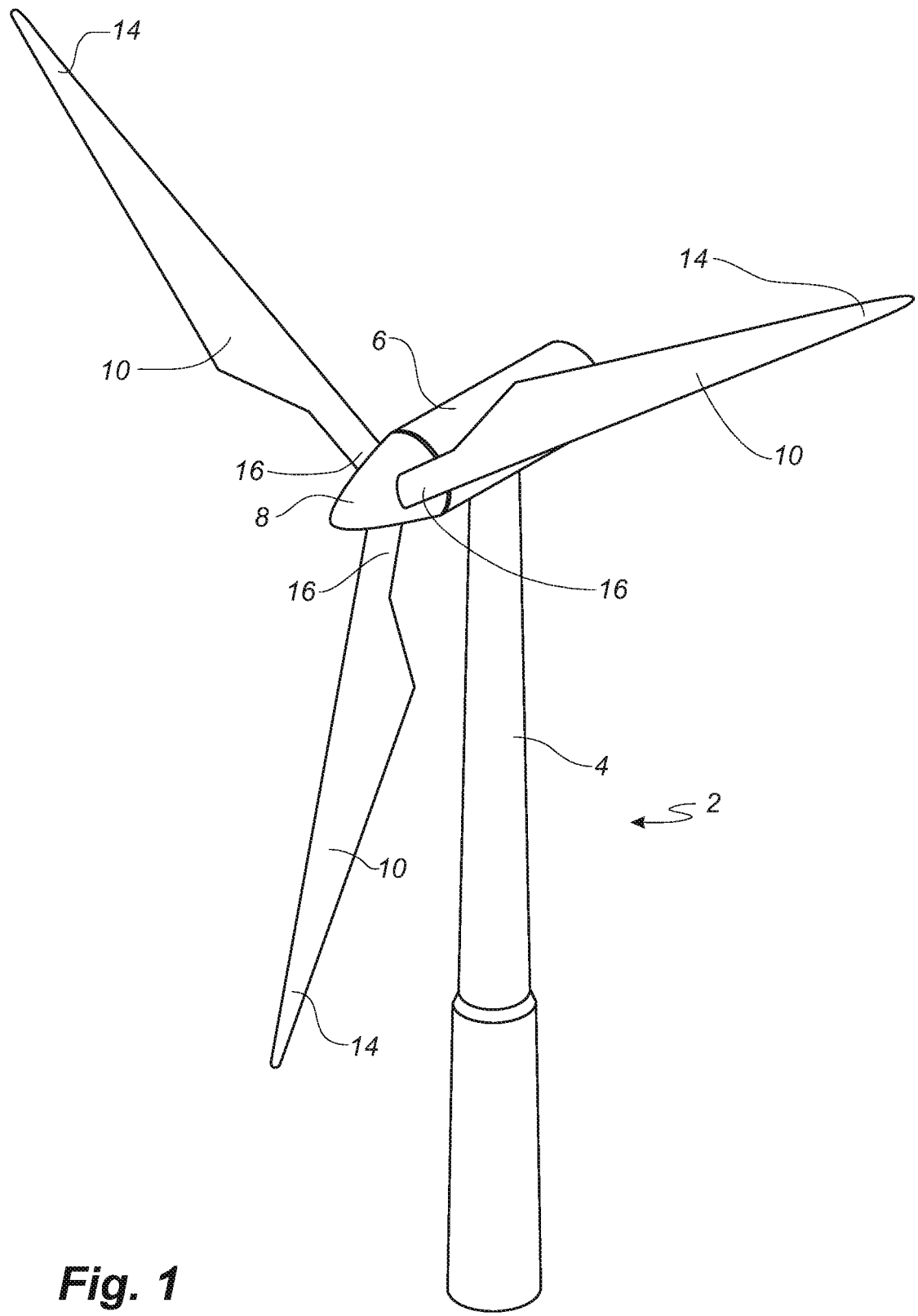
FIG. 1 shows a wind turbine.

In carbon fibre blades, it is necessary to potential equalise the carbon fibres to the lightning protection system of the blade. This can be carried out via for instance a mesh arranged on a carbon fibre layer. However, high current tests have shown that local damages may occur in areas in the interface between a mesh and the carbon laminate, due to partly limited conductivity in the interface between the mesh and the top carbon laminate. Having a mesh on top a carbon laminate is not sufficient to prevent damages due to high current of lightning.

These damages may cause delamination to the load carrying structure in areas and can thus lead to severe fatigue damage and failure of the blade.

The present disclosure addresses this problem by providing a wind turbine blade by integrating a dissipating element made of an electrically conductive material into the potential equalisation means and which comprises at least one transverse connector configured to be arranged and to extend transverse through a thickness of electrically conductive fibre layers and configured to dissipate energy into the plurality of electrically conductive fibres layers. The transverse connectors equalise the potential difference between the lightning protection system and the electrically conductive fibres layers by extending through the thickness of the stacked the electrically conductive fibres layers and dissipating energy into the electrically conductive fibres layers.

The present disclosure relates to a wind turbine blade. Accordingly, the invention preferably relates to a wind turbine blade as well as wind turbine blade parts having a total length of at least 30 metres, 40 metres, 45 metres, or 50 metres. The wind turbine blade comprises a load carrying structure, a shell body and a lightning protection system. The load carrying structure is for example a main or principle laminate, a spar, a spar cap of the wind turbine blade. The invention is in the following explained in relation to a blade design with the load carrying structure integrated into the shell. However, it is obvious that the invention may also be implemented in a design with a load carrying structure in form of a spar and an aerodynamic shell attached to the spar.

The shell body refers the contour layers of the wind turbine blade. The shell body may advantageously be aerodynamic and formed as a thin or relatively thin shell. In one or more embodiments, the load carrying structure may be integrated into the shell body. The lightning protection system is configured to protect the wind turbine blade and its structure from damages occurring when submitted to high current due to e.g. lightning.

The wind turbine blade extends in a longitudinal direction between a root end and a tip end. The wind turbine blade is formed as an elongated structure having a longitudinal direction between the root end to the tip end.

The load carrying structure is made of a fibre-reinforced polymer material and comprises a plurality of stacked fibre layers. The stacked fibre layers comprising electrically conductive fibres, such as carbon fibres. The fibre-reinforcement material may substantially be composed of carbon fibres and glass fibres, carbon being more electrically conductive than glass.

The lightning protection system comprises a lightning receptor arranged freely accessible in or on the shell body. The lightning receptor may be arranged below the exterior surface of the blade shell, level with the exterior surface, or protruding from the exterior surface. The lightning receptor may refer to an electrically conductive element that is configured to capture a current (e.g. a lightning current). The lightning receptor is arranged to be freely accessible in or on the shell body.

The lightning protection system comprises a lightning down-conductor, which is electrically connected to the lightning receptor and is further configured to be electrically connected to a ground connection. The lightning down-conductor refers to a conductive means for conducting a current from the lightning receptor to the ground connection, and thus protecting the wind turbine blade and its load carrying laminate structure from delamination damages from the high current of the lightning. The lightning down-conductor may be configured to act as an inner down-conductor that is arranged internally in the shell body. The lightning down-conductor may be configured to extends along substantially the entire length of the blade, such as along the longitudinal direction of the blade. The lightning down-conductor may be configured to connect to ground connection via direct electrical connection and/or a spark gap. The down-conductor may be a cable, e.g. as described in WO 2007/062659.

The wind turbine blade further comprises a potential equalisation system, which provides a potential equalising connection between a number of the electrically conductive fibres of the load carrying structure and the lightning protection system. The potential equalising connection may comprise an earthing cable, a bar, or a strap between the carbon fibres, and the lightning protection system. The potential equalising connection may provide low resistance. The potential equalising connection is configured to equalize or balance potential difference between two areas of the wind turbine blade, so as to prevent build-up of static charges and so as to prevent any damages to the laminate of the load carrying structure from lightning currents jumping into the load carrying structure.

The potential equalisation system comprises a dissipating element made of an electrically conductive material. Examples of electrically conductive materials comprises metal, such as copper, aluminium, silver, gold or any combination thereof.

The dissipating element comprises at least one transverse connector that is arranged so as to extend transverse through a thickness of the stacked fibre layers and configured to dissipate energy into a plurality of said stacked fibre layers. The at least one transverse connector is for example arranged to dissipate energy from a lightning strike, such as a high current, into the stacked fibre layers by penetrating the stacked fibre layers or extending transverse through the thickness or depth of the stacked fibre layers. In one or more embodiments, the transverse connector comprises a spike, a needle, a hook, and/or a staple. In one or more embodiments, the transverse connectors are arranged on the substantially planar element according to a density criterion (e.g. one transverse connector per cm$^2$) and/or a pre-determined distance between juxtaposing transverse connectors (such as distance of about 1 cm). In other words, the transverse connectors may be arranged on the substantially planar element according to a distribution criterion, such as randomly or uniformly. This provides an even potential equalisation across the area of the substantially planar element.

In one or more embodiments, the dissipating element comprises a planar element and a plurality of transverse connectors, which extend from the planar element. For example, the planar element comprises a mesh, a grid, and/or a plate.

In one or more embodiments, the dissipating element is configured to cover a surface between 0.5 m$^2$ and 2 m$^2$, such as a surface of about 1.2-1.5 m$^2$, such as a quadrilateral surface having dimensions: 1 m×1.3 m. Accordingly, the dissipating element provides a potential equalisation across a relatively large area.

In one or more embodiments, the dissipating element comprises one or more crossings, such as knots. The dissipating element may comprise a mesh with one or more crossings and a spike/needle/hook/staple at each crossings. This provides a simple design for providing a large surface area and cross layer potential equalisation.

In one or more embodiments, the transverse connectors are arranged to extend through at least three layers comprising electrically conductive fibres, such as at least three stacked fibre layers part of the load carrying structure. It may be envisaged that the transverse connectors are arranged to extend through two or three stacked fibre layers comprising carbon fibre layers.

In one or more embodiments, the dissipating element is arranged on an innermost stacked fibre layer of the load carrying structure. The innermost stacked fibre layer corresponds to a fibre layer distal to the exterior of the blade. For example, the dissipating element is arranged at a distal placement to the exterior of the blade. This provides a simple method for attaching the dissipating element to the load carrying structure.

In one or more embodiments, the wind turbine blade comprises a plurality of potential equalisation systems distributed along the longitudinal direction of the wind turbine blade. According to one or more embodiments, the wind turbine blade may comprise a plurality of potential equalisation systems placed in the tip region of the wind turbine blade, in the airfoil region of the wind turbine blade and/or in the transition region between the root and the airfoil regions.

In one or more embodiments, the lightning receptor is arranged at or in immediate vicinity of the tip end of the wind turbine blade, so as to capture any lightning current about to strike or striking the wind turbine blade.

The present disclosure further relates to a wind turbine comprising a wind turbine blade according to aspects of this disclosure.

The present disclosure additionally relates to a potential equalization system. The potential equalization system comprises a dissipating element made of an electrically conductive material, which comprises a substantially planar element and which comprises at least one transverse connector extending from the substantially planar element. The at least one transverse connector is configured to be arranged and to extend transverse through a thickness of electrically conductive fibre layers. The at least one transverse connector is configured to dissipate energy into a plurality of electrically conductive fibres layers. The potential equalization system comprises a potential equalising connection configured to connect the dissipating element to a lightning protection system.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
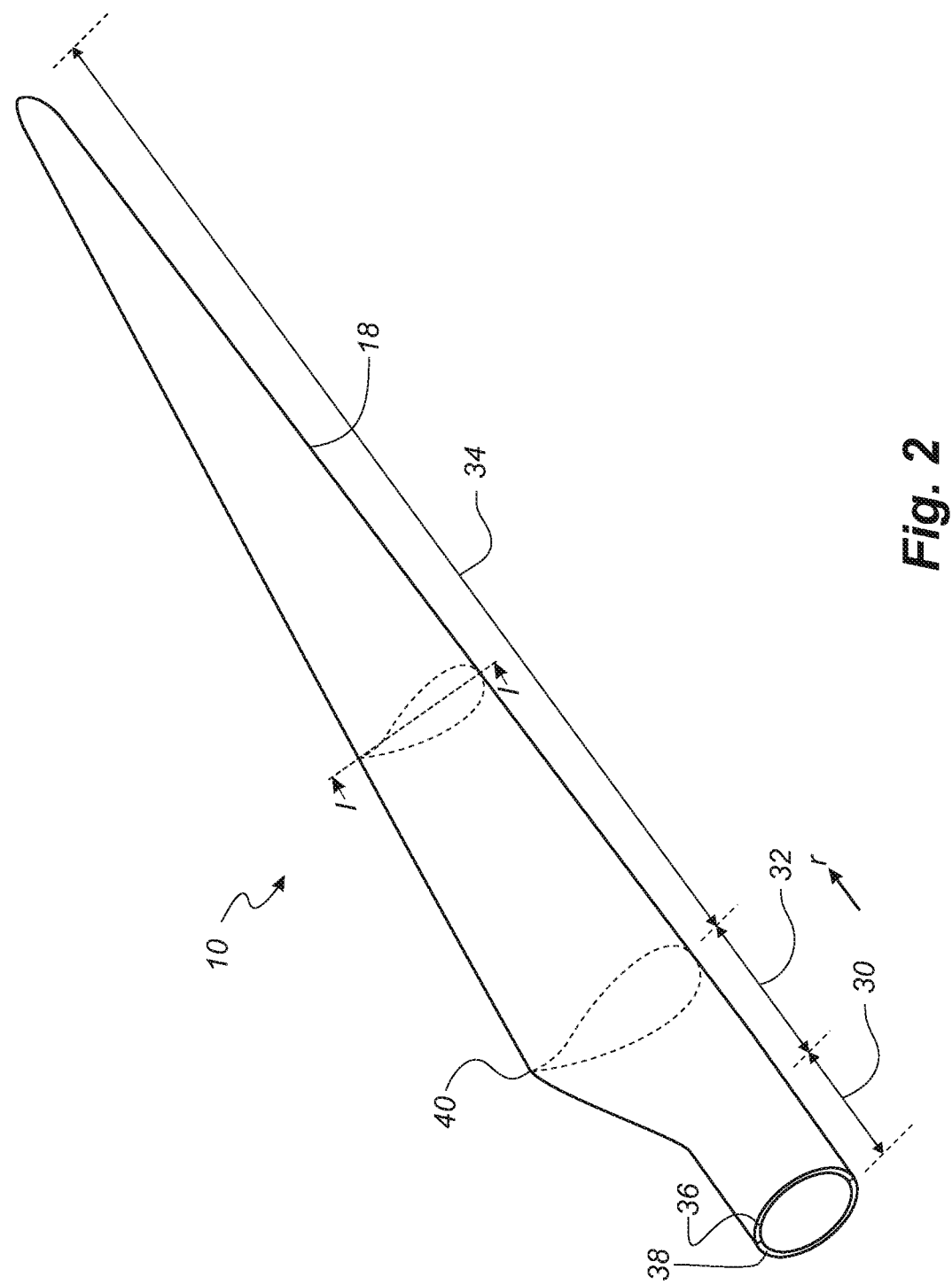
FIG. 2 shows a schematic view of a wind turbine blade according to the disclosure.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

The load-carrying structure preferably extends substantially in a longitudinal direction of the wind turbine blade 20 in direction between a root region 30 and a tip end of the airfoil region 18 of the blade 20.

Figure 3:
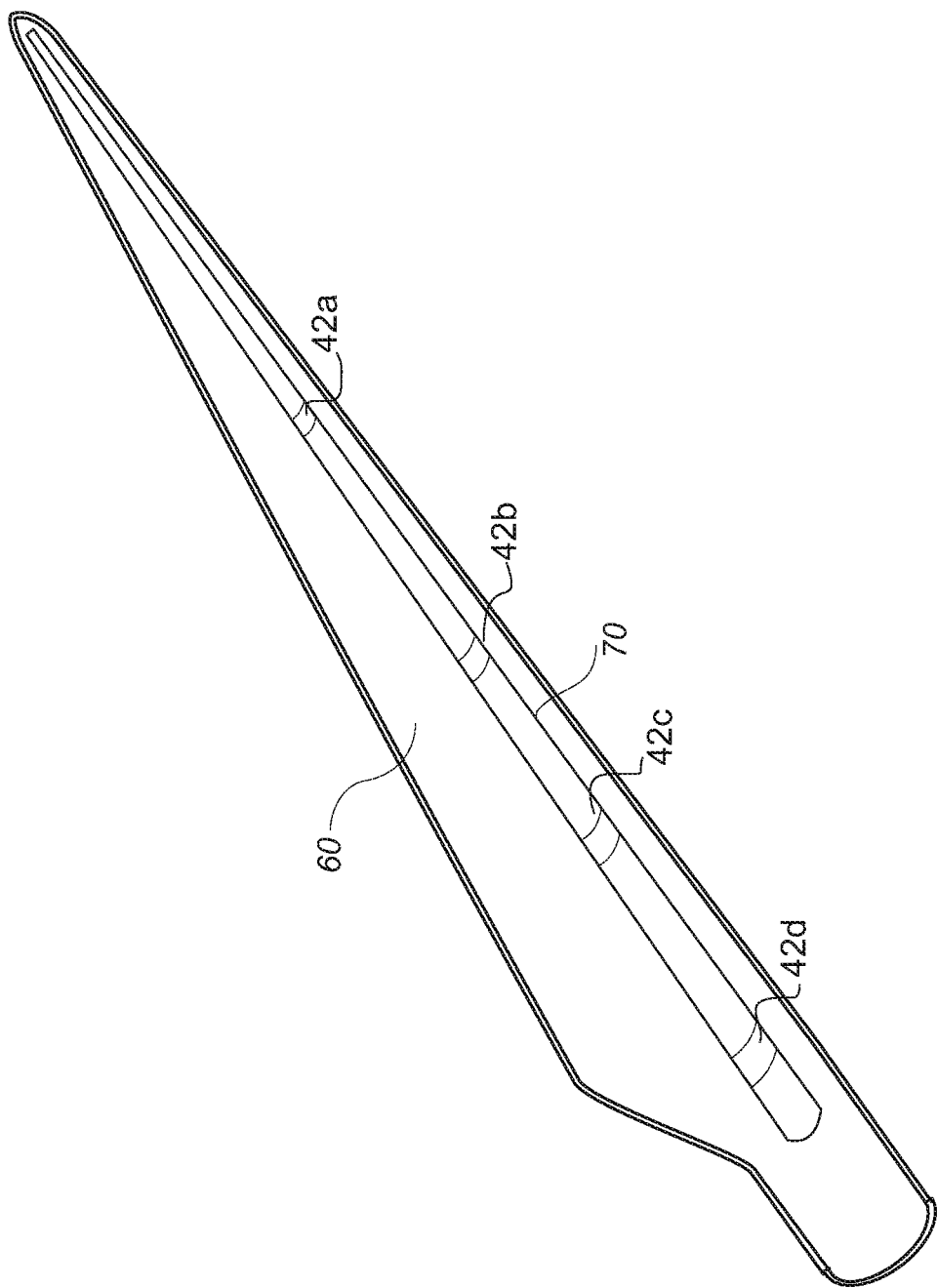
FIG. 3 shows a perspective view of a part of the wind turbine blade comprising the load carrying structure according to this disclosure.

FIG. 3 shows a perspective view of a blade shell part, which comprises a cured blade element 60, and a load carrying structure 70, which forms an integrally formed spar cap or main laminate of the blade shell part. The blade shell part comprises dissipating elements 42a-42d, which are arranged on the load carrying structure 70 and distributed along the length of the blade shell. Dissipating elements 42a-42d may for instance be spaced substantially equidistantly. The dissipating elements 42a-42d are to be electrically connected to the lightning protection system of the blade (not shown).

Figure 4A:
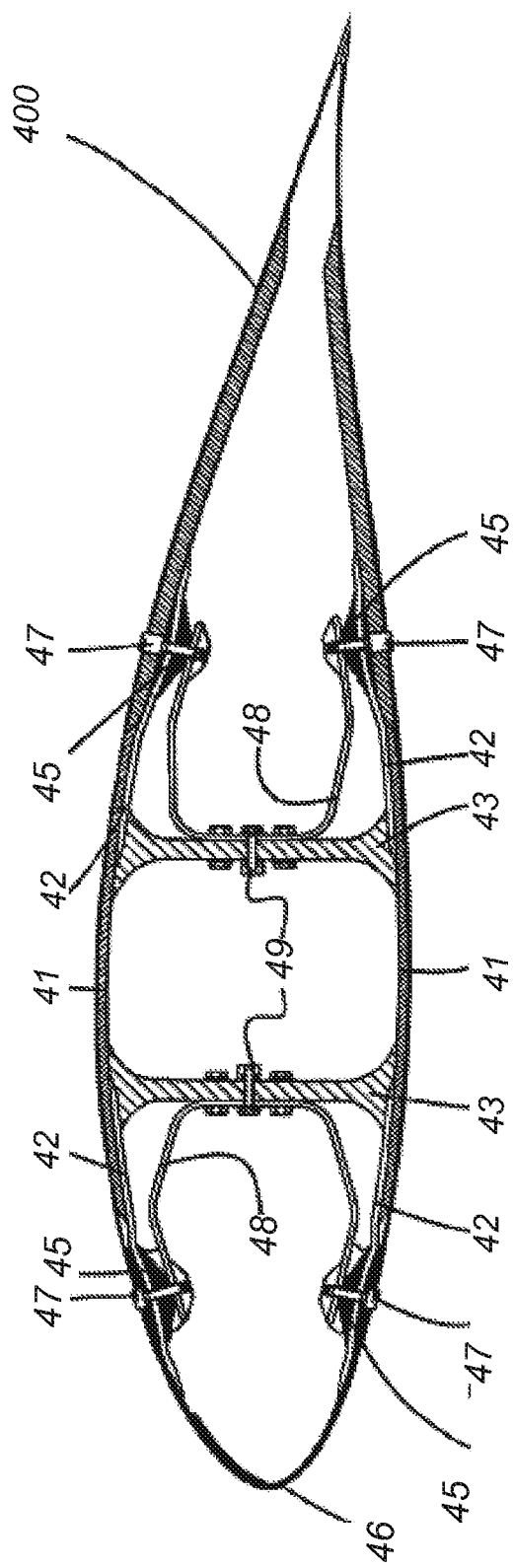
FIG. 4a shows a cross-sectional view of an exemplary wind turbine blade according to this disclosure.

FIG. 4a shows a cross-sectional view of an exemplary wind turbine blade 400 according to this disclosure. It is noted that the design shown in FIG. 4a corresponds to the embodiments shown in EP 1 664 528, where the wind turbine blade comprises a plurality of lightning receptor. However, it is recognised that the invention is also applicable and advantageous for an embodiment as shown in WO 2007/062659 having only a single lightning receptor, e.g. arranged near the tip of the blade, and being connected to a down-conductor in form of a cable, the cable being an insulated or non-insulated cable.

The wind turbine blade comprises a blade shell 46 with an integrated load carrying structure 41, and a lightning protection system. The inner part of the blade 400 comprises two substantially longitudinally extending shear webs 43. The lightning protection system comprises a number of lightning receptors 47 provided at the exterior surface of the blade shell 46. The lightning protection system comprises lightning down-conductors 49 which are each electrically connected to a lightning receptor 47 via connection 48. In another embodiment (not shown) comprising a lightning protection system with only a single lightning receptor, the lightning down-conductor may be directly connected to the lightning receptor.

The lightning down-conductors 49 are further configured to be electrically connected to a ground connection. The lightning receptors 47, and connections 48 are for example metallic elements configured to conduct a lightning current that may be extremely high or powerful. The lightning current must be conducted reliably from the lightning down-conductors 49 to a ground connection (not shown), including optionally across a spark gap. The lightning receptors 47 may be connected to connections 48 by terminals that are configured for reliably transferring a lightning current from the receptor 47 to the connection 48. In blade 400, the load carrying structure 41 comprise electrically conductive fibres, such as carbon fibres. The blade 400 comprises a potential equalization system 42 configured to provide a potential equalising connection between the electrically conductive fibres of the load carrying structure 41 and the lightning protection system. The potential equalization systems 42 are each connected to a corresponding portion of the electrically conductive fibres in load carrying structure 41, and connected to the down-conductors 49 via the lightning receptors 47 or alternatively or additionally directly to the down-conductor 49 via a separate conductor. The potential equalisation system 42 comprises a dissipating element made of an electrically conductive material. The dissipating element is shown as if it is a layer in FIG. 4a, however the dissipating element comprises a substantially planar element that is formed as e.g. a grid, a plate, or a mesh. The dissipating element further comprises at least one transverse connector (not shown) that is arranged so as to extend transverse through a thickness of the stacked fibre layers of the load carrying structure 41. The transverse connector is configured to dissipate energy into the plurality of said stacked fibre layers. The potential equalisation system 42 may also be connected to a down-conductor 49 in some other manner. When the potential equalisation system 42 and hence the conductive fibres are connected to the down-conductor 49, the fibres, the potential equalisation system 42 and the down-conductor 49 have the same potential, thereby at least reducing the risk of a flashover from a lightning current in the down-conductor 49 transferring to the fibres of the load carrying structure 41. The lightning receptors 47 are preferably arranged next to the load carrying structure 41 so as not to compromise the strength thereof. The number and location of the lightning receptors 47 are selected to be in accordance with the dimensions of the blade 400. The potential equalisation system 42 may extend across the entire main laminate and only a single down-conductor may be sufficient to conduct the current to the ground.

As mentioned, the embodiment shown in FIG. 4a comprises a plurality of lightning receptors. In another embodiment having only a single or a few lightning receptors, the lightning down-conductor may be arranged internally in the blade, e.g. on one of the shear webs. The dissipating element may then be arranged on the load carrying structure, which is potential equalised via a conductor to the lightning down conductor.

Figure 4B:
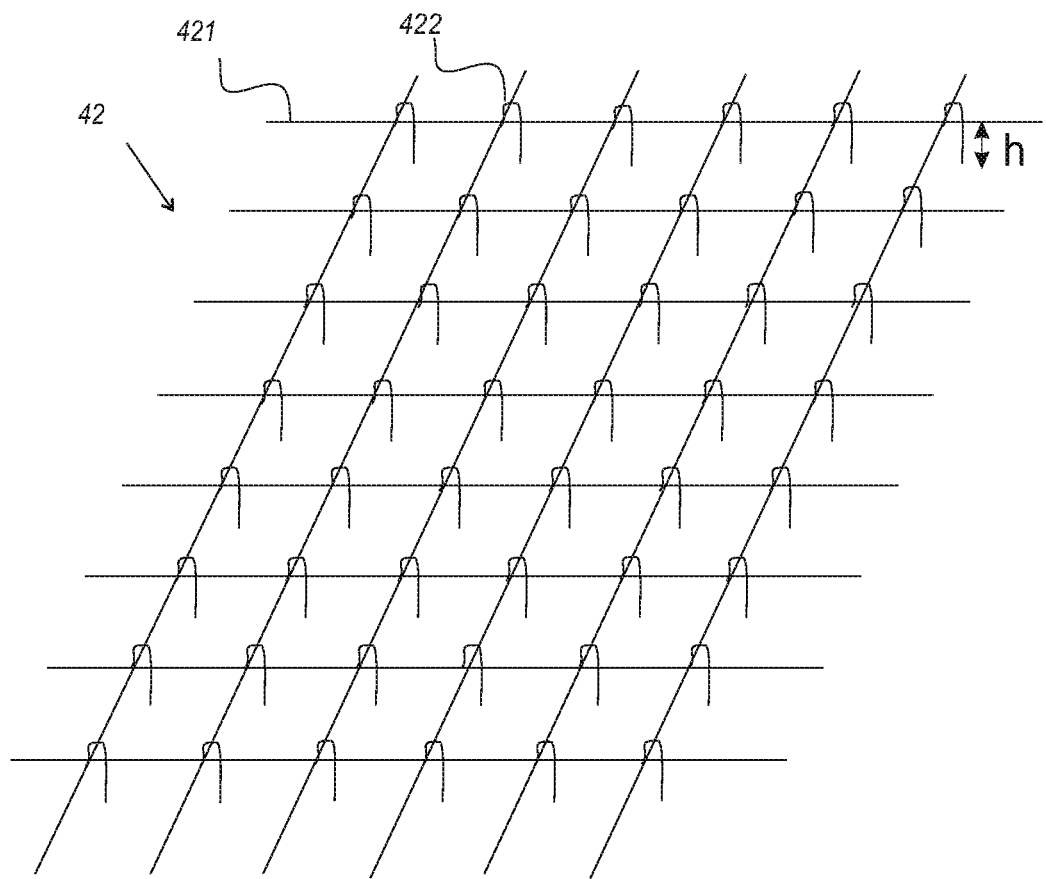
FIG. 4b shows a schematic diagram illustrating an exemplary potential equalization system according to this disclosure.

FIG. 4b shows a schematic diagram illustrating a dissipating element of an exemplary potential equalization system 42 according to this disclosure. The potential equalization system comprises a dissipating element 42 that comprises a substantially planar element 421 in form of a mesh or grid made of an electrically conductive material (such as metal). The dissipating element 42 comprises a plurality of transverse connectors 422. The transverse connectors 422 are configured to be attached to the substantially planar element 421. The transverse connectors 422 are configured to extend transverse through a thickness of electrically conductive fibre layers, such as to penetrate the thickness of electrically conductive fibre layers of a load carrying structure. Thereby, the transverse connectors 422 are configured to dissipate energy into the plurality of electrically conductive fibres layers due to the increased contact surface. It can be seen that the connections between the mesh 421 and the electrically conductive fibres is increased or enhanced by adding transverse connectors 422. This allows the mesh 421 to be in contact with additional electrically conductive fibres layers than only the top/interfacing electrically conductive fibres layer. The transverse connectors 422 are provided in form spikes, or hooks. They may be in form of needles or staples. The mesh 421 comprises one or more crossings or connections, such as knots. The transverse connectors 422 are placed at the mesh 421 uniformly with a pre-determined distance between juxtaposing transverse connectors (such as distance of about 1 cm). The transverse connectors are arranged to extend with a depth h through a number of layers comprising electrically conductive fibres, such as at least three stacked fibre layers part of the load carrying structure. The depth h determines the amount of electrically conductive fibres layers that can distribute or dissipate the current into the thickness of the load carrying structure. For example, the deeper penetrating transverse connector, the more electrically conductive fibres layers are in contact with and can thus dissipate the current. It can be envisaged that the transverse connectors 422 form an integral part of the mesh 421 or are added to the mesh 421 when installed on electrically conductive fibres. The potential equalization system comprises a potential equalising connection (not shown) configured to connect the dissipating element to a lightning protection system. This connection may be provided in form of a cable or another type of conductor.

Figure 4C:
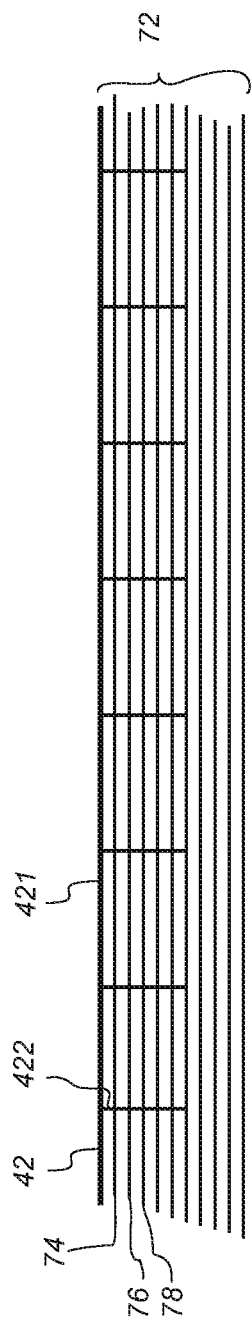
FIG. 4c shows a cross section view of a load carrying structure with an exemplary potential equalisation system according to this disclosure.

FIG. 4c shows a longitudinal cross section view of a load carrying structure 72 with an exemplary dissipating element 42 of a potential equalisation system according to this disclosure. The cross section of the load carrying structure 72 shows a first interfacing fibre layer 74 (i.e. an innermost layer), a second fibre layer 76, and a third fibre layer 78. The fibre layers 74, 76, 78 may comprise for instance be carbon fibres only or it may be a hybrid material comprising for instance both glass fibres and carbon fibres.

FIG. 4c shows how the exemplary dissipating element 42 of the potential equalisation system according to this disclosure is positioned on top of the load carrying structure 72. The dissipating element 42 comprises a planar element 421 and a plurality of transverse connectors 422. The cross-section shows how the planar element 421 lies on top of the fibre layer 74 and the transverse connectors 422 extend through the thickness of the stacked fibre layers with a depth of four to five layers. The dissipating element 42 or the planar element 421 is arranged on an innermost stacked fibre layer of the load carrying structure. The innermost stacked fibre layer corresponds to a fibre layer distal to the exterior of the blade. For example, the dissipating element is arranged at a distal placement to the exterior of the blade. The dissipating element is configured to cover a surface between 0.5 m² and 2 m², such as a surface of about 1.2-1.5 m² of the load carrying structure 72.

Figure 5:
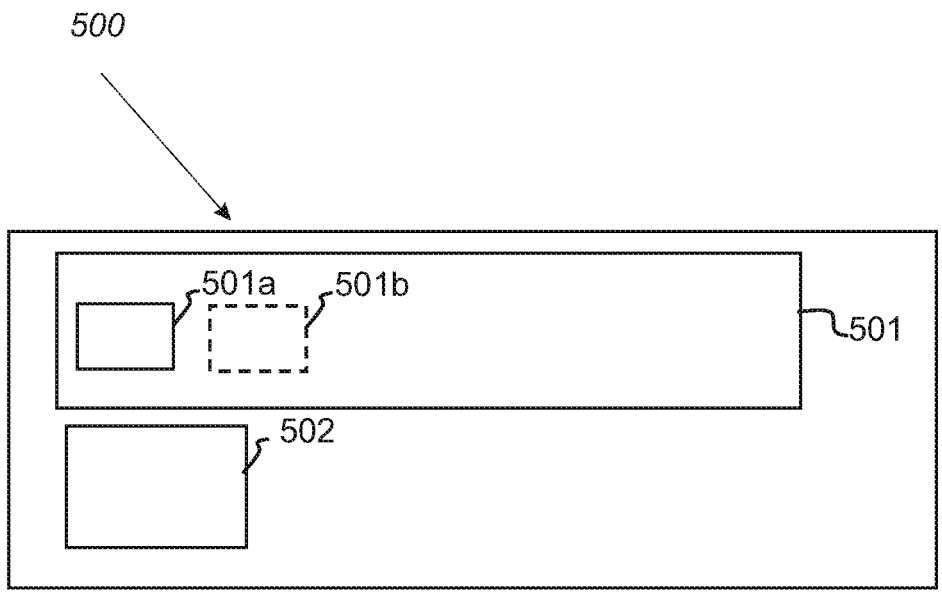
FIG. 5 shows a block-diagram illustrating an exemplary potential equalization system according to this disclosure.

FIG. 5 shows a block-diagram illustrating an exemplary potential equalization system 500 according to this disclosure. The potential equalization system 500 comprises a dissipating element 501 made of an electrically conductive material and which comprises at least one transverse connector 501a. The at least one transverse connector 501a is configured to be arranged and to extend transverse through a thickness of electrically conductive fibre layers. The at least one transverse connector 501a is configured to dissipate energy into a plurality of electrically conductive fibres layers.

In one or more embodiments, the dissipating element 501 comprises a substantially planar element 501b and a plurality of transverse connectors 501a, which extend from the substantially planar element 501b. For example, the substantially planar element 501b comprises a mesh, a grid, and/or a plate.

The potential equalization system 500 comprises a potential equalising connection 502 configured to connect the dissipating element to a lightning protection system.

The invention has been described with reference to a preferred embodiment. However, the scope of the invention is not limited to the illustrated embodiment, and alterations and modifications can be carried out without deviating from the scope of the invention.

The invention claimed is:

1. A wind turbine blade, comprising:
   a load carrying structure comprising a fibre-reinforced polymer material, the load carrying structure further comprising a plurality of stacked fibre layers forming a thickness, the plurality of stacked fibre layers each comprising electrically conductive fibres, wherein the wind turbine blade extends in a longitudinal direction between a root end and a tip end;
   a shell body;
   a lightning protection system comprising:
      a lightning receptor arranged freely accessible in or on the shell body; and
      a lightning down-conductor electrically connected to the lightning receptor and configured to be electrically connected to a ground connection; and
   at least one potential equalization system providing a potential equalizing connection between at least a portion of the electrically conductive fibres of the load carrying structure and the lightning protection system, the at least one potential equalization system comprising:
      a dissipating element made of an electrically conductive material; and
      at least one transverse connector extending transversely through the thickness of the plurality of stacked fibre layers and which is configured to dissipate energy into the plurality of stacked fibre layers, the dissipating element comprising a substantially planar element and the at least one transverse connector extending from the substantially planar element.

2. The wind turbine blade according to claim 1, wherein the planar element is selected from the group consisting of a mesh, a grid, and a plate.

3. The wind turbine blade according to claim 2, wherein the at least one transverse connector is arranged on the planar element according to a density criterion.

4. The wind turbine blade according to claim 2, wherein the at least one transverse connector comprises a plurality of transverse connectors, and the plurality of transverse connectors are arranged on the planar element according to a pre-determined distance between juxtaposed ones of the plurality of transverse connectors.

5. The wind turbine blade according to claim 1, wherein the dissipating element comprises metal.

6. The wind turbine blade according to claim 5, wherein the metal is selected from the group consisting of copper, aluminum, silver, gold and combinations thereof.

7. The wind turbine blade according to claim 1, wherein the dissipating element is configured to cover a surface area between 0.5 m² and 2 m².

8. The wind turbine blade according to claim 1, wherein the at least one transverse connector is selected from the group consisting of a spike, a needle, a hook, a staple, and combinations thereof.

9. The wind turbine blade according to claim 1, wherein the dissipating element comprises at least one connection and a mesh with at least one crossing, wherein at least one spike extends from the at least one crossing.

10. The wind turbine blade according to claim 9, wherein the at least one connection comprises at least one knot.

11. The wind turbine blade according to claim 1, wherein the at least one transverse connector extends through at least three of the plurality of stacked fibre layers.

12. The wind turbine blade according to claim 1, wherein the dissipating element is arranged on an innermost one of the plurality of stacked fibre layers.

13. The wind turbine blade according to claim 1, wherein the at least one potential equalization system comprises a plurality of potential equalization systems arranged along the longitudinal direction of the wind turbine blade.

14. The wind turbine blade according to claim 1, wherein the lightning receptor is arranged at or adjacent to the tip end of the wind turbine blade.

15. The wind turbine blade according to claim 1, wherein the load carrying structure is integrated into the shell body.

16. The wind turbine blade according to claim 1, wherein the electrically conductive fibres comprise carbon fibres.

17. A wind turbine comprising a wind turbine blade according to claim 1.

18. A potential equalization system for a wind turbine blade, comprising:
   a dissipating element made of an electrically conductive material, the dissipating element comprising a substantially planar element and a plurality of transverse connectors, the plurality of transverse connectors extending from the substantially planar element, the plurality of transverse connectors being configured to extend transversely through a thickness of a plurality of electrically conductive fibre layers of a wind turbine blade, and being further configured to dissipate energy into the plurality of electrically conductive fibre layers of the wind turbine blade; and a potential equalizing connection configured to connect the dissipating element to a lightning protection system.

* * * * *

UNITED STATES PATENT AND TRADEMARK OFFICE
CERTIFICATE OF CORRECTION

| | | |
|---|---|---|
| PATENT NO. | : 10,584,684 B2 | Page 1 of 1 |
| APPLICATION NO. | : 16/064758 | |
| DATED | : March 10, 2020 | |
| INVENTOR(S) | : Lars Nielsen and Klavs Jespersen | |

It is certified that error appears in the above-identified patent and that said Letters Patent is hereby corrected as shown below:

On the Title Page

Item (72), please remove the second Inventor Country "DE" and replace with "DK"

Signed and Sealed this
Fifth Day of May, 2020

Andrei Iancu
*Director of the United States Patent and Trademark Office*